United States Patent
Büttiker

(10) Patent No.: US 8,336,448 B2
(45) Date of Patent: Dec. 25, 2012

(54) DISPENSING DEVICE AND COFFEE MACHINE FOR MILK AND MILK FOAM

(75) Inventor: Philipp Büttiker, Oberbuchsiten (CH)

(73) Assignee: Jura Elektroapparate AG, Niederbuchsiten (CH)

( * ) Notice: Subject to any disclaimer, the term of this patent is extended or adjusted under 35 U.S.C. 154(b) by 532 days.

(21) Appl. No.: 12/701,939

(22) Filed: Feb. 8, 2010

(65) Prior Publication Data

US 2010/0212508 A1 Aug. 26, 2010

(30) Foreign Application Priority Data

Feb. 24, 2009 (EP) .................................... 09405034

(51) Int. Cl.
 *A47J 31/40* (2006.01)
 *A47J 31/44* (2006.01)
 *A47J 31/02* (2006.01)
 *A23F 5/00* (2006.01)
 *A23C 3/02* (2006.01)

(52) U.S. Cl. ............. 99/290; 99/293; 99/316; 99/323.1; 222/132; 222/146.4; 426/432; 426/433

(58) Field of Classification Search .................... 99/293, 99/290, 295, 302 R, 316, 323.1; 222/129.1, 222/132, 145.5, 146.4; 426/231, 432, 433, 426/434
See application file for complete search history.

(56) References Cited

U.S. PATENT DOCUMENTS

| | | | | |
|---|---|---|---|---|
| 4,922,810 A | * | 5/1990 | Siccardi | 99/323.1 |
| 5,207,148 A | * | 5/1993 | Anderson et al. | 99/281 |
| 5,337,652 A | * | 8/1994 | Fischer et al. | 99/282 |
| 5,339,725 A | * | 8/1994 | De'Longhi | 99/293 |
| 5,638,740 A | * | 6/1997 | Cai | 99/295 |
| 5,740,946 A | * | 4/1998 | Swier et al. | 222/129.1 |
| 6,006,654 A | * | 12/1999 | Pugh | 99/293 |

(Continued)

FOREIGN PATENT DOCUMENTS

CN 2239549 Y 11/1996

(Continued)

OTHER PUBLICATIONS

European Search Report for Application No. EP 09 40 5034 dated Jul. 29, 2007.

(Continued)

*Primary Examiner* — Sebastiano Passaniti
(74) *Attorney, Agent, or Firm* — Alston & Bird LLP

(57) ABSTRACT

A dispensing device for milk and/or milk foam is provided that includes a mixing device for mixing steam, milk and/or air. A mixing device may include a chamber, a first line for the supply of milk into the chamber, a second line for a supply of steam into the chamber, a third line for the supply of air into the chamber, at least one outlet for dispensing the milk and/or the milk foam from the chamber, a valve including an adjustable regulating shaft for regulating the supply of milk and/or air into the chamber. By adjusting the regulating shaft between different predetermined positions at least one flow of milk may be switched on and switched off and/or altered and a flow of air may be switched on and switched off and/or altered. A dispensing device may further include a drive motor for adjusting the regulating shaft of the valve and a control device for controlling the drive motor. The regulating shaft may be movable by controlling the drive motor by means of the control device into respective predetermined positions.

16 Claims, 2 Drawing Sheets

U.S. PATENT DOCUMENTS

| | | | |
|---|---|---|---|
| 6,499,389 B1* | 12/2002 | Probst | 99/323.1 |
| D486,346 S | 2/2004 | Jonsson | |
| 6,901,848 B2* | 6/2005 | Beretta | 99/453 |
| 6,977,091 B2* | 12/2005 | Carhuff et al. | 426/590 |
| D523,279 S | 6/2006 | Zemp | |
| 7,252,034 B1* | 8/2007 | Eckenhausen et al. | 99/293 |
| 7,350,457 B2* | 4/2008 | Wessels et al. | 99/323.1 |
| 7,448,314 B2* | 11/2008 | Ioannone et al. | 99/452 |
| D584,096 S | 1/2009 | Lutz | |
| D586,604 S | 2/2009 | Buttler | |
| D587,511 S | 3/2009 | Buttler | |
| 7,600,467 B2* | 10/2009 | Coccia et al. | 99/293 |
| 7,913,614 B2* | 3/2011 | Fukushima et al. | 99/323.1 |
| 8,003,148 B2* | 8/2011 | Schodler | 426/474 |
| 2006/0174771 A1* | 8/2006 | Frigeri | 99/279 |
| 2009/0011110 A1* | 1/2009 | Gotlenboth | 426/594 |
| 2010/0047406 A1 | 2/2010 | Reyhanloo | |
| 2010/0064900 A1 | 3/2010 | Reyhanloo | |
| 2010/0077927 A1 | 4/2010 | Buttiker | |
| 2010/0080877 A1 | 4/2010 | Reyhanloo | |
| 2011/0070349 A1* | 3/2011 | Burri et al. | 426/474 |
| 2011/0094389 A1* | 4/2011 | Coccia | 99/280 |
| 2011/0192287 A1* | 8/2011 | Riessbeck et al. | 99/285 |

FOREIGN PATENT DOCUMENTS

| | | |
|---|---|---|
| CN | 2933405 Y | 8/2007 |
| CN | 201019564 Y | 2/2008 |
| DE | 20 2007 009 537 U1 | 10/2007 |
| DE | 10 2006 043 903 B3 | 2/2008 |
| EP | 1 115 317 A0 | 3/2000 |
| EP | 1 656 863 A1 | 5/2006 |
| JP | 09147229 A | 6/1997 |
| JP | 2005073869 A | 3/2005 |

OTHER PUBLICATIONS

U.S. Appl. No. 12/701,939, filed Feb. 8, 2010, In re: Buttiker entitled *Dispensing Device and Coffee Machine for Milk and Milk Foam*.

U.S. Appl. No. 12/768,215, In re: Reyhanloo entitled *Drink Preparation Machine*, filed Apr. 27, 2010.

U.S. Appl. No. 12/633,165, filed Dec. 8, 2009; In re: Buttiker entitled *Drive for a Coffee Brewing Device and Coffee Brewing Device*.

\* cited by examiner

DISPENSING DEVICE AND COFFEE MACHINE FOR MILK AND MILK FOAM

CROSS-REFERENCE TO RELATED APPLICATIONS

This application claims priority to European Application No. 09405034.1, filed Feb. 24, 2009, which is hereby incorporated herein in its entirety by reference.

FIELD

The invention relates to a dispensing device for milk and/or milk foam and a coffee machine comprising such a dispensing device.

BACKGROUND

In known dispensing devices for milk and/or milk foam, usually milk is mixed with steam (in particular water vapor) and possibly air, to produce heated milk or milk foam and/or a mixture of heated milk and milk foam. Such dispensing devices are frequently also integrated in coffee machines, particularly as coffee machines generally also comprise a device for producing water vapor. Coffee machines comprising an integrated dispensing device for milk and/or milk foam in the known manner make it possible to produce either coffee (without the addition of milk) or heated milk (without the addition of coffee) or white coffee (without the addition of milk foam) or speciality coffees, which contain milk foam or foamed milk (for example cappuccino or latte macchiato).

In dispensing devices for milk and/or milk foam, which are used in combination with coffee machines, generally a vacuum is produced ("Venturi effect") by a jet of steam in a suitably shaped nozzle ("Venturi nozzle") which makes it possible to suck from a reservoir (milk container) filled with milk a portion of milk via a line between the nozzle and the reservoir and to conduct said portion of milk into the nozzle. To produce heated milk only (without milk foam), the suctioned milk may be mixed in a chamber of the respective dispensing device with the steam injected into the nozzle and, as a result, heated. Subsequently, the milk-steam-mixture thus produced may be dispensed in the form of a steady output jet from the dispensing device via an outlet into a suitable receptacle. To produce milk foam and/or foamed milk, additional air may be suctioned with the steam jet (for example via a continuous line for the ambient air) and mixed in the chamber with the respective suctioned milk. In this variant, a milk-steam-air mixture in the form of a steady output jet may be dispensed from the chamber via the outlet into a suitable receptacle, in this case a mixture of heated milk and milk foam being collected in the receptacle.

Hitherto, a plurality of dispensing devices for milk and/or milk foam of the aforementioned type, based on a mixture of milk, steam and air have been proposed, which permit a user to produce milk and/or milk foam in different variants.

For example, a dispensing device for producing milk foam is known from EP 1 115 317 B1, in which a flow of the milk respectively suctioned by a steam jet with a valve which is arranged in a line for supplying milk and which comprises a manually adjustable regulating shaft for regulating a supply of milk, may be preselected by a manual adjustment of the regulating shaft and/or altered by a manual adjustment of the regulating shaft. The regulating shaft is an adjustable body with a through-hole for the milk. By a suitable adjustment of the regulating shaft a user may influence and/or limit the quantity of milk suctioned by means of a steam jet. The air respectively suctioned and mixed with the milk may not be specifically influenced in this dispensing device. This dispensing device has the drawback that the possibility of producing different types of milk and/or milk foam is limited. As only the quantity of suctioned milk may be altered by adjusting the regulating shaft, a user is only able to foam milk with this dispensing device and thus at best influence the quantity and the temperature of the milk foam produced and/or the mixture of heated milk and milk foam produced. A use of this dispensing device in combination with a coffee machine is, therefore, extremely awkward for a user with regard to the production of speciality coffees, which are based on a combination of coffee, milk and/or milk foam, particularly because before producing a specific coffee speciality the user firstly has to determine by experimentation the optimal setting of the regulating shaft of the valve which corresponds to the wishes of the user. Several attempts at this are generally necessary. In this connection, it is a drawback that a manual adjustment of the regulating shaft is generally time-consuming and only able to be duplicated inaccurately. It is, therefore, difficult for a user to produce different types of milk foam and/or a mixture of heated milk and milk foam and/or different types of speciality coffees.

A dispensing device based on a mixture of milk, steam and air for producing milk foam and heated milk is also known from EP 1 688 074 B1, in which an inlet opening for air in a line for supplying air comprising a valve for controlling the air supply may be selectively opened or closed. A closure body of the valve may be moved by means of an electric motor to selectively open the valve by activating the electric motor and in this manner to permit the supply of air or to close the valve and in this manner to prevent the supply of air. The dispensing device further comprises a line for the supply of milk, a user having no possibility of regulating (i.e. switching off, switching on and/or varying) a flow of milk through this line. In this dispensing device, therefore, a user may suck a predetermined quantity of milk with a steam jet and at the same time mix the suctioned air either with the steam and a predetermined quantity of air (provided the valve is opened for controlling the air supply) or simply mix with the steam (provided the valve is closed for controlling the air supply). In this dispensing device, by actuating the valve a user only has the possibility of producing two different types of milk beverages: a predetermined quantity of heated milk without a proportion of milk foam (with the valve closed) or a predetermined quantity of foamed milk with a predetermined consistency (with the valve open). This dispensing device also has the drawback, therefore, that the possibility of producing different types of milk and/or milk foam is limited. In combination with a coffee machine, therefore, this dispensing device also provides a user with little freedom of choice when producing speciality coffees, which are based on a combination of coffee, milk and/or milk foam.

SUMMARY

An object of the present invention is to avoid the aforementioned drawbacks and to provide a dispensing device for milk and/or milk foam, which is able to produce repeatedly a large number of different types of milk beverages based on milk and/or milk foam in a simple manner with predetermined properties in each case and of predetermined quality in each case, in a reproducible manner. The dispensing device is also intended to be able to be used in combination with a coffee machine. This object is achieved by a dispensing device of one embodiment of the present invention.

This dispensing device comprises a mixing device for mixing steam, milk and/or air, which mixing device comprises: a chamber, a first line for the supply of milk into the chamber, a second line for the supply of steam into the chamber, a third line for the supply of air into the chamber, at least one outlet for dispensing the milk and/or the milk foam from the chamber and a valve comprising an adjustable regulating shaft for regulating the supply of milk and/or air into the chamber, by adjusting the regulating shaft between different predetermined positions at least one flow of milk being able to be switched on and switched off and/or altered and a flow of air being able to be switched on and switched off and/or altered.

Via the first line, the second line and the third line, accordingly milk, steam and possibly air may be supplied into the chamber, so that milk, steam and possibly air may form a mixture in the chamber.

The chamber may, for example, also be configured as a "vacuum chamber". The term "vacuum chamber" is understood in this context to be a chamber in which, by the supply of steam into the aforementioned chamber, a pressure may be produced which is lower than the pressure in the first line and/or the pressure in the second line and/or the pressure in the third line (Venturi principle). In this case, the supply of steam may produce a vacuum in the chamber relative to the pressure respectively prevailing in the first line and thus provide for the supply of milk into the chamber. Accordingly, the supply of steam may produce a vacuum in the chamber relative to the pressure respectively prevailing in the third line and thus provide for the supply of air into the chamber.

Alternatively, it is possible to provide the respective lines with means which are appropriate for respectively producing an overpressure in the respective lines, relative to the pressure prevailing in the chamber, and to introduce milk, steam and possibly air into the chamber via the respective lines. To this end, the lines may, for example, be respectively connected to a pump.

According to one embodiment of the invention, the dispensing device comprises a drive motor for adjusting the regulating shaft of the valve and a control device for controlling the drive motor, the regulating shaft being able to be moved by controlling the drive motor by means of the control device into the respective predetermined positions.

The dispensing device according to this embodiment of the invention makes it possible to initiate a supply of steam through the second line into the chamber and—depending on the respective position of the regulating shaft—to inject milk and/or air at respectively different flow rates via the first line and/or the second line into the chamber and to dispense via the outlet the mixture of steam, milk and/or air respectively produced in the chamber.

By adjusting the regulating shaft (i.e. by adjusting a single element) both the through-flow of milk through the first line and also the through-flow of air through the third line may be altered, the dispensing device makes it possible in a simple manner to produce a wide variety of different mixtures of steam, milk and/or air and to dispense said mixtures via the outlet.

As the dispensing device comprises a drive motor for adjusting the regulating shaft of the valve and a control device for controlling the drive motor and the regulating shaft may be moved by controlling the drive motor by means of the control device into different predetermined positions, it is possible to move the regulating shaft automatically at a predetermined velocity and with a high degree of accuracy into the different predetermined positions and in this manner to produce the respectively desired mixtures of steam, milk and/or air.

The different predetermined positions of the regulating shaft may be stored in the control unit. The control unit is preferably configured such that each of the predetermined positions may be selected by a user and activated on command of the user. Accordingly, the dispensing device makes it possible to produce, in a reproducible manner, a large number of different types of milk beverages based on milk and/or milk foam in a simple manner in any sequence, with any number of repetitions, with predetermined properties in each case and with predetermined quality in each case.

The mixing device may also be configured so that the milk and/or the milk foam may be mixed with further additives, for example chocolate and/or cocoa.

The dispensing device may be used separately for producing milk beverages based on milk and/or milk foam or in combination with devices for producing other beverages. In combination with a coffee machine, this dispensing device provides the user with the possibility of producing a wide variety of speciality coffees, which are based on a combination of coffee, milk and/or milk foam.

In one embodiment of the dispensing device a drive shaft of the drive motor is coupled via a releasable connection to the regulating shaft. In a preferred variant of this embodiment, the mixing device may be removed as a whole from the remaining parts of the milk dispensing device after releasing the releasable connection. These measures make it easy to clean the dispensing device and in particular the mixing device, to eliminate milk residues, for example from the dispensing device and/or the mixing device after use and thus to be able to maintain normal hygienic standards.

The dispensing device according to one embodiment of the invention may, for example, be used in combination with a coffee machine and to this end may be arranged in the surroundings of a coffee outlet head of the respective coffee machine. In this context the term "coffee outlet head" is understood to be a sub-assembly which comprises at least one outlet or a plurality of outlets for dispensing a coffee beverage and a supporting structure, which holds the respective outlets in a predetermined position on the coffee machine.

The dispensing device according to one embodiment of the present invention may preferably be arranged on a coffee machine such that the mixing device is arranged on an outer face of a housing of the coffee machine. This has the advantage that all lines, which convey milk (for example from a reservoir for milk) to the mixing device, may exclusively be arranged on the outer face of the housing of the coffee machine, so that no milk has to be guided into the interior of the coffee machine defined by the housing. In this manner, milk residues that may occur in the interior of the coffee machine may be avoided. All lines which convey the milk to the mixing device are, therefore, easily accessible and may be monitored with little effort and optionally removed, replaced, or cleaned.

In a further variant of the aforementioned coffee machine, the coffee outlet head is arranged on the outer face of the housing of the coffee machine, and the dispensing device is fastened to the coffee outlet head. In this case, the coffee outlet head and the dispensing device form a compact unit. The respective coffee outlet head and the dispensing device are preferably arranged in the vicinity of one another such that a coffee beverage dispensed from the coffee outlet head and the milk respectively dispensed from the dispensing device and/or the milk foam respectively dispensed from the dispensing device at the same time or successively may run into the same receptacle, without the position of the receptacle having to be altered relative to the coffee outlet head or relative to the dispensing device.

In a further variant of the aforementioned coffee machine, the coffee outlet head comprises a housing in which the mixing device is accommodated. This has the advantage that the mixing device is protected from soiling and a user is able to be prevented from touching the mixing device during operation of the coffee machine. The latter prevents, in particular, inadvertent contact with the parts of the mixing device subjected to hot steam and thus protects a user from burning the skin.

In another embodiment of the invention, the coffee outlet head is arranged on the coffee machine such that the mixing device is accessible from the outside of the housing and as a whole may be separated from the coffee machine. This has the advantage that the mixing device may be easily removed and cleaned after use.

In a further embodiment, the dispensing device is positioned relative to the housing of the coffee machine such that the drive motor is arranged in the inside of the housing of the coffee machine and the drive shaft of the drive motor and/or the regulating shaft and/or a gear mechanism connecting the drive shaft and the regulating shaft or a coupling connecting the drive shaft and the regulating shaft protrudes through an opening in the housing of the coffee machine. This variant has the advantage that, on the one hand, the drive motor is covered by the housing and protected and, on the other hand, the mixing device may be positioned outside the housing. Thus, the dispensing device requires less space outside the housing, and the mixing device remains accessible from the outside of the housing of the coffee machine and, therefore, is easily accessible and able to be monitored with little effort and if required removed, replaced, or cleaned.

In a further variant of the aforementioned coffee machines, the coffee outlet head and the dispensing device are movably arranged relative to the housing of the coffee machine, a vertical position of the coffee outlet head and a vertical position of the dispensing device being able to be altered simultaneously. As a result, the respective vertical positions of the coffee outlet head and the dispensing device may together and in a simple manner be adapted optimally to the height of the respective receptacle into which coffee and/or milk and/or milk foam is intended to be dispensed from the coffee outlet head and/or the dispensing device.

BRIEF DESCRIPTION OF THE DRAWINGS

Further details of the invention and, in particular, exemplary embodiments of the dispensing device for milk and/or milk foam according to the invention are explained hereinafter with reference to the accompanying drawings, in which.

DETAILED DESCRIPTION

Figure 1:
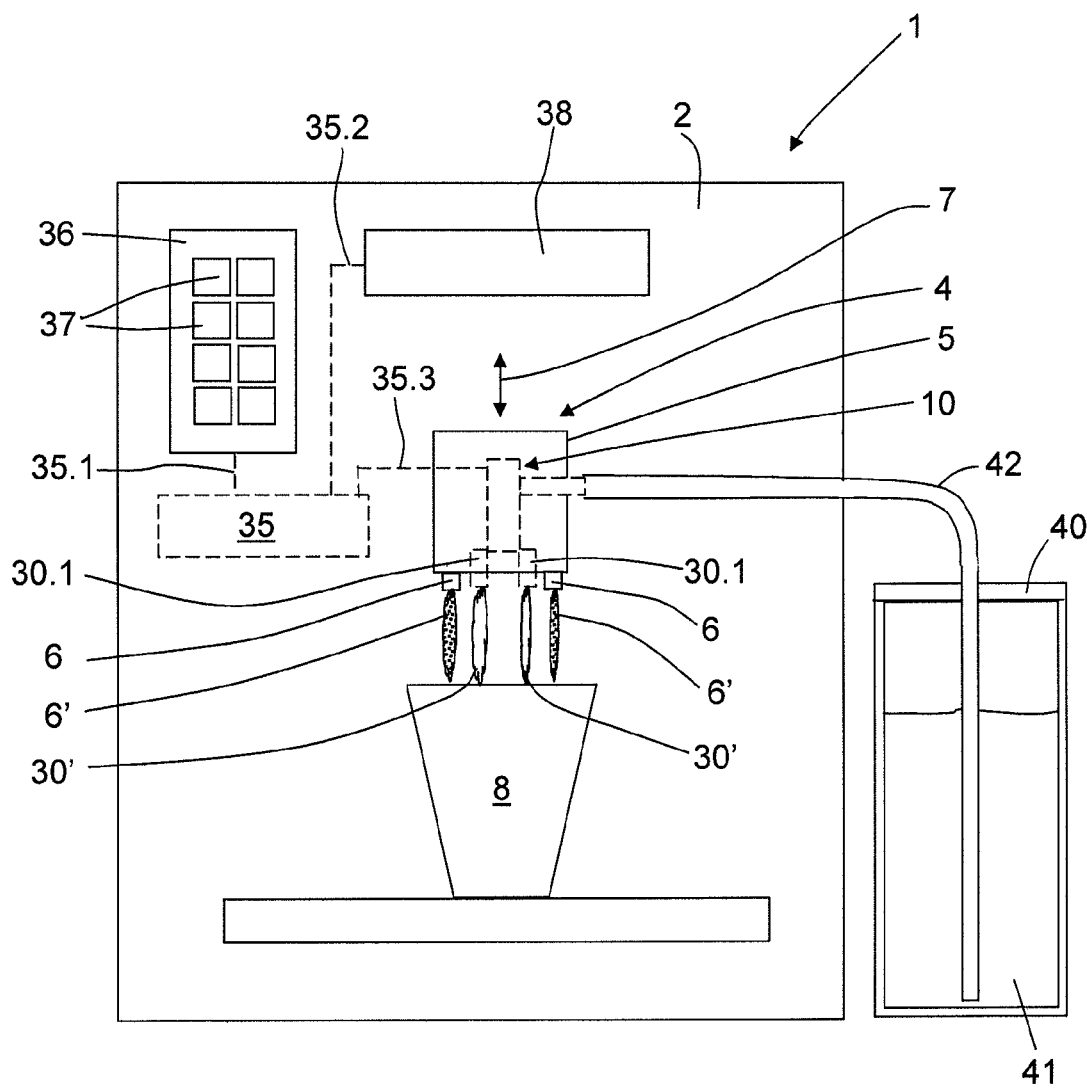
FIG. 1 shows a coffee machine with a coffee outlet head in combination with a dispensing device for milk and/or milk foam according to one embodiment of the invention, the dispensing device being partially accommodated in a housing of the coffee outlet head.

FIG. 1 shows a front view of a coffee machine 1 according to one embodiment of the present invention, which is designed for the preparation of a plurality of different beverages and to this end, in particular, for the preparation of coffee, heated milk and foamed milk and for the preparation of speciality coffees, which possibly contain milk and/or milk foam. On the front face of a housing 2 of the coffee machine 1 a coffee outlet head 4 is attached for dispensing a coffee beverage. In the present example, the coffee outlet head 4 comprises two coffee outlets 6 for dispensing a coffee beverage and a housing 5 connected to the coffee outlets 6. The coffee outlets 6 and the housing 5 are arranged to be vertically adjustable and to this end (by means of guide means not shown in FIGS. 1-3) are guided on the housing 2 of the coffee machine 1 in the direction of a vertical line, as is indicated in FIG. 1 by a double arrow 7. In this manner it is possible to adapt in an appropriate manner the vertical position of the coffee outlet head 4 relative to a receptacle 8, which is provided for receiving a coffee beverage dispensed via the coffee outlets 6 and to this end is positioned below the coffee outlets 6. As shown in FIG. 1, the respectively dispensed coffee beverage leaves the respective coffee outlet 6 in the form of a coffee jet 6'.

A dispensing device 10 according to one embodiment of the invention for milk and/or milk foam is further arranged on the front face of the housing 2 of the coffee machine 1. In the present example, the dispensing device 10 is fastened to the coffee outlet head 4 and at least partially enclosed by the housing 5 of the coffee outlet head 4, as is explained in more detail hereinafter in combination with FIG. 3. As the dispensing device 10 is fastened to the coffee outlet head 4, the dispensing device 10 together with the coffee outlet head 4 is vertically adjustable relative to the receptacle 8.

As FIG. 1 shows, in the interior of the coffee machine 1 a control device 35 is accommodated, which controls all of the processes which may be carried out by the coffee machine, in particular the preparation and dispensing of the respectively desired coffee beverages and the dispensing of milk and/or milk foam. The components of the coffee machine 1 involved in the preparation and the dispensing of the respective coffee beverages are not shown in FIGS. 1-3 (apart from the coffee outlet head 4).

During operation, the coffee machine 1 may be operated by a user by means of a control panel 36 arranged on the housing 2, which comprises a plurality of manually actuatable buttons 37 (in the present example eight) and is connected to the control device 35 via a line 35.1 for transmitting data and/or control signals. A specific process which may be carried out by the coffee machine is associated with each individual button 37. By actuating the respective button 37, a user may select the respectively desired beverage, in particular from a predetermined list of a plurality of different beverages, which may be prepared by means of the coffee machine 1, and initiate the preparation of this beverage.

The control device 35 is, moreover, connected via a line 35.2 for transmitting data and/or control signals to a display 38 so that, by transmitting corresponding data and/or control signals, it is possible to initiate the representation of information about the respective operating state of the coffee machine by means of the display 38.

Figure 2:
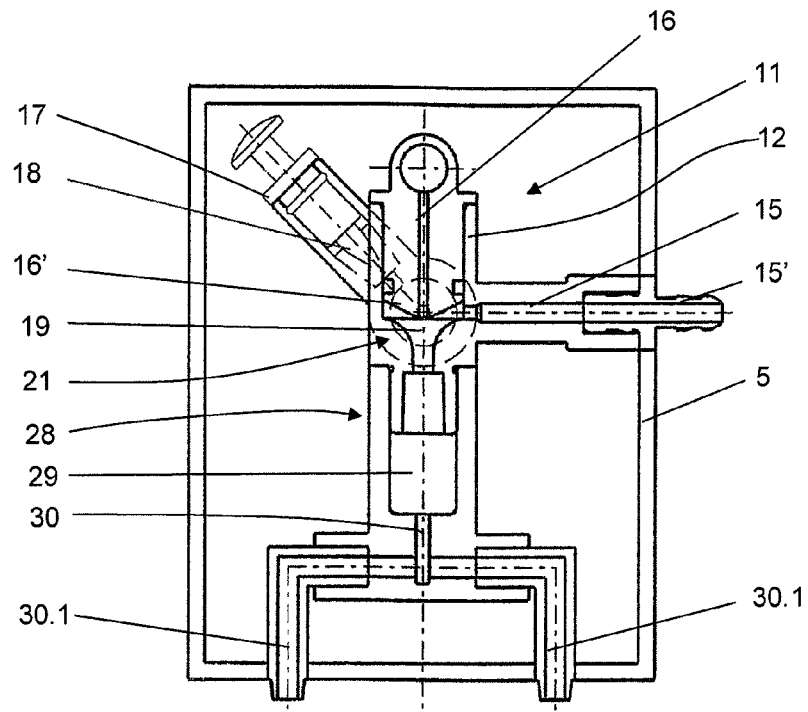
FIG. 2 shows the dispensing device and the housing of the coffee outlet head according to FIG. 1 in a vertical section.
Figure 3:
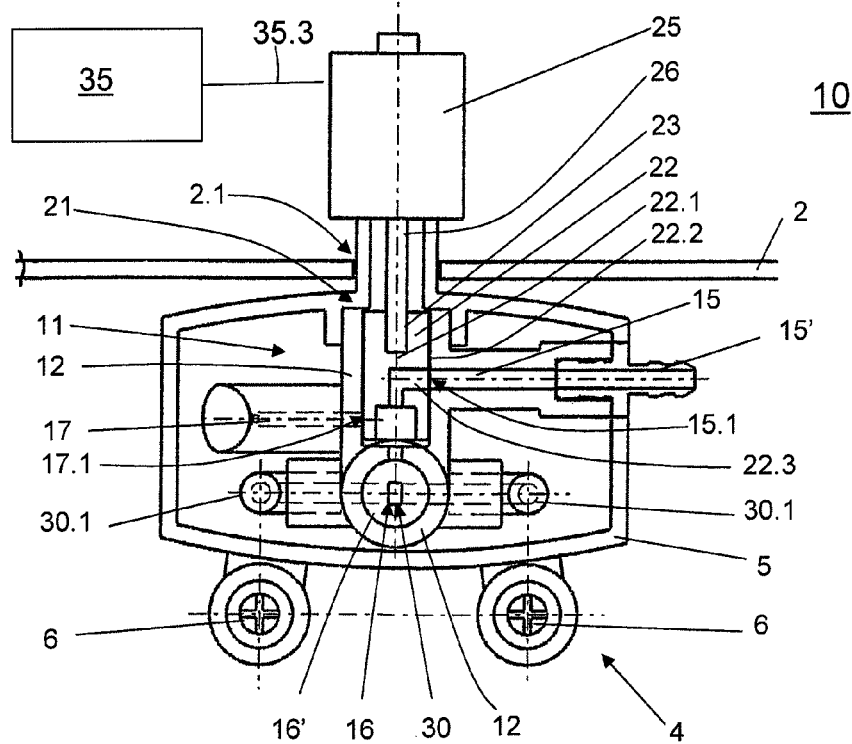
FIG. 3 shows the dispensing device and the coffee outlet head according to FIG. 1 in a horizontal section.

As FIG. 1 also indicates, the control device 35 is connected via a line 35.3 for transmitting data and/or control signals to the dispensing device 10 for milk and/or milk foam, to control a dispensing of milk and/or milk foam (as is explained in more detail in combination with FIGS. 2 and 3).

In the present example, a container 40, which contains a milk reservoir 41, is arranged adjacent to the coffee machine 1. To permit the production of a beverage containing milk and/or milk foam, the dispensing device 10 is connected to the container 40 via a pipe 42 immersed in the milk reservoir 41. If required, a portion of milk may be suctioned from the milk reservoir 41 via the pipe 42—initiated by the control device 35—and in this manner provided for supplying milk to the dispensing device 10. As FIG. 1 indicates, the dispensing device 10 has two outlets 30.1 via which milk and/or milk foam may flow out of the dispensing device 10 in the form of a milk jet and/or milk foam jet 30', for example into the receptacle 8 (FIG. 1). Thus it is possible to fill two receptacles 8 at the same time to the same filling level.

The pipe 42 and/or a portion of the pipe 42 immersed in the milk reservoir 41, may also be replaced by a lance and/or a conduit. The container 40 may be provided with a cooling device (for cooling the container 40 and/or for cooling the milk reservoir 41) and with thermal insulation (relative to the surroundings of the container 40), to keep the milk reservoir 41 cool.

As FIG. 1 indicates, the pipe 42 extends on an outer face of the housing directly towards the dispensing device 10. The dispensing device is in the present example also arranged such that the milk supplied to the dispensing device 10 does not have to be conveyed into the interior of the coffee machine 1. In this manner, milk residues that may occur in the interior of the coffee machine 1 are precluded. All parts which come into contact with the milk are, therefore, easily accessible and may be monitored with little effort and if required removed, replaced or cleaned.

With reference to FIGS. 2 and 3, further details of the dispensing device 10 are outlined hereinafter.

As is revealed from FIGS. 2 and 3, the dispensing device 10 comprises, amongst other things, a mixing device 1 for mixing steam, milk and/or air. The mixing device 11 comprises a housing 12 in which the following are arranged and/or formed:

a chamber 19,
a first line 15 for the supply of milk into the chamber 19,
a second line 16 for the supply of steam into the chamber 19,
a third line 17 for the supply of air into the chamber 19,
an outlet device 28 for milk and/or milk foam which comprises an emulsifying chamber 29 connected to the chamber 19 for receiving a mixture of steam, milk and/or air produced in the chamber 19 and a bore 30 for the outlet of milk and/or milk foam from the emulsifying chamber 29 (and/or the mixing device 11), the bore 30 in the present example opening into the two outlets 30.1 for the milk and/or the milk foam, and
a valve 21 comprising an adjustable regulating shaft 22 for regulating the supply of milk and/or air into the chamber 19.

The first line 15 may be connected via an adapter 15' to the pipe 42, to ensure a supply of milk from the container 40.

The second line 16 is connected to a steam generator of the coffee machine 1 (not shown in FIGS. 1-3) to introduce steam if required into the second line.

As FIG. 2 indicates, the third line 17 is open at the end remote from the chamber 19 and permits at this end the entry of ambient air into the line 17. The third line is nevertheless provided with a non-return valve 18 (for example in the form of a membrane valve) to ensure that, on the one hand, ambient air may penetrate through an air hole formed in the non-return valve 18 (limiting the supply of air) into the third line 17 and thus into the chamber 19 of the mixing device 11 and, on the other hand, however, milk supplied to the mixing device 11 is prevented from escaping via the third line 17 and possibly soil the aforementioned air hole and thus impair the supply of air via the third line 17 in an uncontrolled manner.

As FIG. 2 indicates, the second line 16 opens in the present example into the chamber 19 via a nozzle 16' which is formed such that steam which flows from the line 16 via the nozzle 16' into the chamber 19 produces a vacuum in the chamber 19 (according to the Venturi effect). As the first line 15 (for milk) and the third line 17 (for air) also open into the outlet device 28 via the chamber 19, a steam jet injected into the chamber 19 via the second line 16 causes a suction effect in the first line 15 and in the third line 17 and ensures that (without the assistance of further pumps) milk is suctioned via the first line 15 and possibly air via the third line 17 into the chamber 19 and may be mixed and/or swirled there with the steam, to heat the milk (if no air is supplied via the third line 17) or to foam the milk by swirling with air, and to produce a mixture of heated milk and milk foam (if air is supplied via the third line 17).

The regulating shaft 22 of the valve 21 is, in the present case, configured as a cylindrical body which is mounted on the inner walls of the housing 11 such that the regulating shaft 22 may be rotated about its longitudinal axis 22.1 and thus may be adjusted by rotations about the longitudinal axis 22.1

As may be derived from FIG. 3, the first line 15 and the third line 17 open directly on an outer peripheral surface 22.2 of the regulating shaft 22 into the interior of the housing 12, in FIG. 3, the reference numeral 15.1 denoting the corresponding opening of the first line 15 and the reference numeral 17.1 denoting the corresponding opening of the third line 17. Accordingly, the regulating shaft 22 may close the opening 15.1 and/or the opening 17.1 and thus prevent a supply of milk via the first line 15 into the chamber 19 and/or a supply of air via the third line 17 into the chamber 19, unless channels formed in the regulating shaft 22 form a continuous connection between the first line 15 and the chamber 19 and/or between the third line 17 and the chamber 19.

To permit that a supply of milk into the chamber 19 may be regulated by adjusting the regulating shaft 22 (i.e. by a rotation about the longitudinal axis 22.1 by a specific angle of rotation), in the regulating shaft a channel 22.3 is formed, which is open towards the outer peripheral surface 22.2 of the regulating shaft 22 and forms at the opening 15.1 a through-passage between the first line 15 and the chamber 19, the cross section of this through-passage being dependent on the respective (angular) position of the regulating shaft 22. In the example according to FIG. 3, the channel 22.3 and the first line 15 overlap at the opening 15.1 such that the cross section of the through-passage between the first line 15.1 and the chamber 19 is at a maximum and thus a supply of milk through the channel 22.3 is possible at maximum flow rate. With a rotation of the regulating shaft 22 about the longitudinal axis 22.1 by a specific angle of rotation, the cross section of the through-passage between the first line 15 and the chamber 19 may be altered and, in particular, reduced by a predetermined amount, the size thereof depending on the shape and arrangement of the channel 22.3, on the shape and arrangement of the first line 15 and the respective angle of rotation. Accordingly, by adjusting the regulating shaft 22 between different predetermined positions, a flow of milk through the first line 15 into the chamber 19 may be altered and possibly switched on and switched off.

In a similar manner, in the regulating shaft 22 a further channel is formed (not shown in FIGS. 1-3), which produces a through-passage between the third line 17 and the chamber 19, the cross section thereof being able to be altered according to the angle of rotation of the regulating shaft 22. Accordingly, a flow of air through the third line 17 into the chamber 19 may be altered and optionally switched on and switched off by adjusting the regulating shaft 22 between different predetermined positions.

As FIG. 3 shows, the dispensing device 10 is provided with a drive motor 25 (for example a stepping motor) which may be activated by means of the control device 35 via the line

35.3, and is used to rotate and, as a result, to adjust the regulating shaft 22 of the valve 21 about the longitudinal axis 22.1 by controlling the control device 35.

The drive motor 25 has a drive shaft 26 which is arranged axially to the longitudinal axis 22.1 of the regulating shaft 22. The drive shaft 26 is preferably releasably coupled to the rotational axis 22.1, to separate the mixing device 11 in the simplest possible manner from the coffee outlet head 4 and/or the coffee machine 1. In the present example, the regulating shaft 22 at one end comprises an axial bore 23 into which the drive shaft 26 may be positively inserted in the direction of the longitudinal axis 22.1. To produce a coupling between the drive shaft 26 and the regulating shaft 22, the mixing device 11 is positioned on the drive shaft 26 such that one end of the drive shaft 26 protrudes into the bore 23. To improve the stability of the coupling, the regulating shaft 22 may optionally be fixed by fastening means (not shown in FIGS. 1-3) to the drive shaft 22.

The valve 21 is configured such that by a rotation (adjustment) of the regulating shaft 22 between a plurality of predetermined positions, both the supply of milk through the first line 15 and also the supply of air through the third line 17 may be varied. In this manner, milk and air may be mixed in different quantities, the mixing ratio between the milk and air being able to be varied over a large range (for example between 100% and 0%).

The respective predetermined positions are stored in the control device 35 and it is possible to move into said positions in a reproducible manner using the drive motor 25, by controlling the control device 35, in a manner which is automatic, rapid and has the respective desired accuracy.

In a variant three different predetermined positions are provided:
- in a first position of the regulating shaft 22 (resting position) the supply of milk into the chamber 19 is closed and the supply of air into the chamber 19 is open (with a maximum through-passage between the third line 17 and the chamber 19).
- in a second position of the regulating shaft 22 (milk foam position) the supply of milk and the supply of air into the chamber 19 are open (with a maximum through-passage between the first line 15 and the chamber 19 and with a maximum through-passage between the third line 17 and the chamber 19.
- in a third position of the regulating shaft 22 (milk position) the supply of milk is restricted (relative to the maximum through-passage between the first line 15 and the chamber 19) and the supply of air into the chamber 19 is closed.

In a further variant, further predetermined positions are provided which may be viewed as intermediate positions relative to the aforementioned positions of the regulating shaft 22. Proceeding from the aforementioned third position (milk position), for example, intermediate positions may be defined in which the supply of milk is restricted to different degrees of intensity (relative to the maximum through-passage between the first line 15 and the chamber 19). By an adjustment of the regulating shaft 22 between said intermediate positions it is possible to bring milk (without the addition of milk foam) to different temperatures.

Proceeding from the aforementioned second position (milk foam position), for example, intermediate positions may be defined in which the supply of air is restricted to different degrees of intensity (relative to the maximum through-passage between the third line 17 and the chamber 19). By an adjustment of the regulating shaft 22 between said intermediate positions it is possible to alter the consistency of the respectively produced milk foam by varying the relative proportion of air mixed with the milk.

It is also possible, proceeding from the aforementioned second position and the aforementioned first position, to define intermediate positions in which both the supply of milk and the supply of air are restricted to different degrees of intensity (relative to the maximum through-passage between the first line 15 and the chamber 19 and/or relative to the maximum through-passage between the third line 17 and the chamber 19). By an adjustment of the regulating shaft 22 between said intermediate positions it is possible to alter the temperature and the consistency of the respectively produced foamed milk.

In the coffee machine 1, different predetermined positions of the regulating shaft 22 are respectively associated with a plurality of different buttons 37. A user of the coffee machine may, therefore, preselect the respective desired position of the regulating shaft 22 by actuating one of the buttons 37 and cause the dispensing device 10 to mix steam, milk and possibly air according to the selected position of the regulating shaft.

In the case of the coffee machine 1, it is possible by means of the control device 35 to initiate the dispensing of a coffee beverage, and to move the regulating shaft 22 into at least one of the predetermined positions before, during or after the dispensing of the coffee beverage. Furthermore, the control device 35 is configured such that the regulating shaft 22 is able to be successively moved into different predetermined positions before, during or after the dispensing of the coffee beverage. These measures make it possible to produce automatically a wide variety of speciality coffees which contain milk and/or milk foam.

As FIG. 3 shows, the drive motor 25 is arranged in the interior of the housing 2 of the coffee machine 1, whilst the mixing device 11 is arranged on the outside of the housing 2. In this manner, the dispensing device 10 requires a particularly small amount of space. To allow a coupling between the regulating shaft 22 and the drive shaft 26 of the drive motor 25, the housing 2 has an opening 2.1 through which the drive shaft 2 protrudes into the space outside the coffee machine 1. The drive shaft 26 protrudes, furthermore, into the housing 5 of the coffee outlet head 4 and is, therefore, able to be coupled within the housing 5 to the regulating shaft 22.

To remove the mixing device 11, the housing 5 has to be opened, for example by removing individual segments of the housing 5. The mixing device 11 is then freely accessible and may be separated from the drive shaft 22 and the adapter 15' and as a whole removed from the coffee machine 1.

Alternatively, the drive shaft 26 of the drive motor 25 and/or the regulating shaft 22 and/or a gear mechanism connecting the drive shaft 26 and the regulating shaft 22 or a coupling connecting the drive shaft 26 and the regulating shaft 22 may be arranged such that they protrude through an opening in the housing 2 of the coffee machine 1. According to a further alternative, the drive 25 may also be accommodated in the housing 5, provided the space in the housing is sufficient.

That which is claimed is:
1. A dispensing device comprising:
 a mixing device, comprising:
  a chamber;
  a first line configured to supply milk into the chamber;
  a second line configured to supply steam into the chamber;
  a third line configured to supply air into the chamber;
  at least one outlet for dispensing at least one of milk and milk foam from the chamber; and a valve comprising an adjustable regulating shaft, wherein the valve is configured to regulate the supply of at least one of milk and air into the chamber by adjusting the regulating shaft between different predetermined positions, one of the different predetermined positions configured to switch on or off or alter a flow of milk or air;

a drive motor configured to adjust the regulating shaft of the valve of the mixing device; and a control device configured to control the drive motor and thereby configured to control the movement of the regulating shaft into the respective predetermined positions.

2. A dispensing device according to claim 1, further comprising a drive shaft connected to the drive motor and coupled via a releasable connection to the regulating shaft.

3. A dispensing device according to claim 2, wherein the mixing device is configured to be removed from the other parts of the dispensing device after releasing the releasable connection between the drive shaft and the regulating shaft.

4. A coffee machine, comprising:

a coffee outlet head configured to dispense a coffee beverage; and a dispensing device, comprising:
  a mixing device, comprising:
    a chamber;
    a first line configured to supply milk into the chamber;
    a second line configured to supply steam into the chamber;
    a third line configured to supply air into the chamber;
    at least one outlet for dispensing at least one of milk and milk foam from the chamber; and
    a valve comprising an adjustable regulating shaft, wherein the valve is configured to regulate the supply of at least one of milk and air into the chamber by adjusting the regulating shaft between different predetermined positions, one of the different predetermined positions configured to switch on or off or alter a flow of milk or air;
  a drive motor configured to adjust the regulating shaft of the valve of the mixing device; and
  a control device configured to control the drive motor and thereby configured to control the movement of the regulating shaft into the respective predetermined positions.

5. A coffee machine according to claim 4, wherein the dispensing device further comprises a drive shaft connected to the drive motor and coupled via a releasable connection to the regulating shaft.

6. A coffee machine according to claim 5, wherein the mixing device of the dispensing device is configured to be removed from the other parts of the dispensing device after releasing the releasable connection between the drive shaft and the regulating shaft.

7. A coffee machine according to claim 4, wherein the coffee outlet head and the dispensing device are movably arranged relative to a housing of the coffee machine and a vertical position of the coffee outlet head and a vertical position of the dispensing device are configured to be altered simultaneously.

8. A coffee machine according to claim 4, wherein the mixing device of the dispensing device is arranged on an outer face of a housing of the coffee machine.

9. A coffee machine according to claim 8, wherein the mixing device of the dispensing device is configured to be separated from the coffee machine.

10. A coffee machine according to claim 4, wherein the coffee outlet head is arranged on an outer face of a housing of the coffee machine and the dispensing device is fastened to the coffee outlet head.

11. A coffee machine according to claim 10, wherein the mixing device of the dispensing device is configured to be separated from the coffee machine.

12. A coffee machine according to claim 10, wherein the coffee outlet head and the dispensing device are movably arranged relative to the housing of the coffee machine and a vertical position of the coffee outlet head and a vertical position of the dispensing device are configured to be altered simultaneously.

13. A coffee machine according to claim 10, wherein the coffee outlet head comprises a housing and the mixing device is accommodated in the housing of the coffee outlet head.

14. A coffee machine according to claim 4, wherein the mixing device of the dispensing device is arranged on an outer face of a housing of the coffee machine, wherein the drive motor is arranged in the inside of the housing of the coffee machine, and wherein at least one of the following protrude through an opening in the housing of the coffee machine: a drive shaft connecting the drive motor to the regulating shaft, the regulating shaft, a gear mechanism connecting the drive shaft and the regulating shaft, a coupling connecting the drive shaft and the regulating shaft.

15. A coffee machine according to claim 4, wherein the dispensing of a coffee beverage is configured to be initiated by means of the control device, and wherein the regulating shaft is configured to be moved into at least one of the predetermined positions before, during, or after the dispensing of the coffee beverage.

16. A coffee machine according to claim 15, wherein the control device is configured to successively move the regulating shaft into a different predetermined position before, during, or after the dispensing of the coffee beverage.

* * * * *